(12) United States Patent
Chen et al.

(10) Patent No.: US 10,581,545 B2
(45) Date of Patent: Mar. 3, 2020

(54) TWO-WIRE LINK FOR TIME-MULTIPLEXED POWER AND DATA TRANSMISSION TO MULTIPLE DEVICES

(71) Applicant: Intel Corporation, Santa Clara, CA (US)

(72) Inventors: Huimin Chen, Beaverton, OR (US); David Harriman, Portland, OR (US); Yong Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/980,442

(22) Filed: May 15, 2018

(65) Prior Publication Data

US 2019/0044638 A1 Feb. 7, 2019

(51) Int. Cl.
| | |
|---|---|
| *H04J 3/00* | (2006.01) |
| *H04J 3/16* | (2006.01) |
| *H04W 52/02* | (2009.01) |
| *H04Q 11/04* | (2006.01) |
| *H04W 72/04* | (2009.01) |
| *H04L 5/14* | (2006.01) |
| *H04L 29/08* | (2006.01) |

(52) U.S. Cl.
CPC .............. *H04J 3/1694* (2013.01); *H04L 5/14* (2013.01); *H04Q 11/0421* (2013.01); *H04W 52/0216* (2013.01); *H04W 72/0446* (2013.01); *H04L 67/12* (2013.01); *H04Q 2213/08* (2013.01)

(58) Field of Classification Search
CPC ........................... H04W 72/0446; H04L 67/12
See application file for complete search history.

(56) References Cited

U.S. PATENT DOCUMENTS

| | | | | |
|---|---|---|---|---|
| 2015/0044966 | A1* | 2/2015 | Shultz ................. | H04B 5/0012 455/41.1 |
| 2015/0207317 | A1* | 7/2015 | Radermacher ............ | H02J 1/06 307/4 |
| 2016/0156232 | A1* | 6/2016 | Joye ..................... | H04B 5/0075 307/104 |

* cited by examiner

*Primary Examiner* — Bo Hui A Zhu
(74) *Attorney, Agent, or Firm* — Green, Howard & Mughal LLP (57) ABSTRACT

An apparatus is provided, where the apparatus may include a first terminal and a second terminal to be coupled to a host via a first wire and a second wire, respectively; a rechargeable storage; and a data circuitry. The apparatus may, during a first time-period, receive power via the first wire and the second wire from the host, and store the power in the rechargeable storage, and during a second time-period, transmit data from the data circuitry to the host via the first wire and the second wire. The first and second time-periods may be non-overlapping time periods. The apparatus is to refrain from transmitting any data to, or receiving any data from, the host during the first time period.

18 Claims, 9 Drawing Sheets

TWO-WIRE LINK FOR TIME-MULTIPLEXED POWER AND DATA TRANSMISSION TO MULTIPLE DEVICES

BACKGROUND

In modern world, various types of sensors are widely used in a plethora of applications. It may be useful to streamline power management of the sensors, and/or data retrieval from the sensors.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

In some embodiments, multiple devices may be coupled to a host using a two-wire link. For example, a first device may be coupled to the host via a first wire and a second wire, a second device may be coupled to the first device via a third wire and a fourth wire, a third device may be coupled to the second device via a fifth wire and a sixth wire, and so on. Thus, the devices may be coupled in series to the host. In some embodiments, the devices may be sensors (e.g., temperature sensors, pressure sensors, flow monitors, accelerometers, and/or the like).

The host may time division multiplex between power delivery to the devices and data collection from the devices in a progressive manner. For example, the host may interleave power delivery and data collection over the first and second wires to and from individual ones of the devices. Thus, as will be discussed in further detail herein, power delivery and data collection between the host and the devices may be performed using merely two outgoing wires from the host. The system may be scalable, e.g., a device may be added to the chain of devices, without increasing a number of outgoing wires from the host to the devices. Other technical effects will be evident from the various embodiments and figures.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" or "some embodiments" means that a particular feature, structure, function, or characteristic described in connection with the embodiment is included in at least one embodiment of the invention. Thus, the appearances of the phrase "in an embodiment" or "in one embodiment" or "some embodiments" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "substantially," "close," "approximately," "near," and "about," generally refer to being within +/- 10% of a target value. For example, unless otherwise specified in the explicit context of their use, the terms "substantially equal," "about equal" and "approximately equal" mean that there is no more than incidental variation between among things so described. In the art, such variation is typically no more than +/-10% of a predetermined target value.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

It is pointed out that those elements of the figures having the same reference numbers (or names) as the elements of any other figure can operate or function in any manner similar to that described, but are not limited to such.

Figure 1:
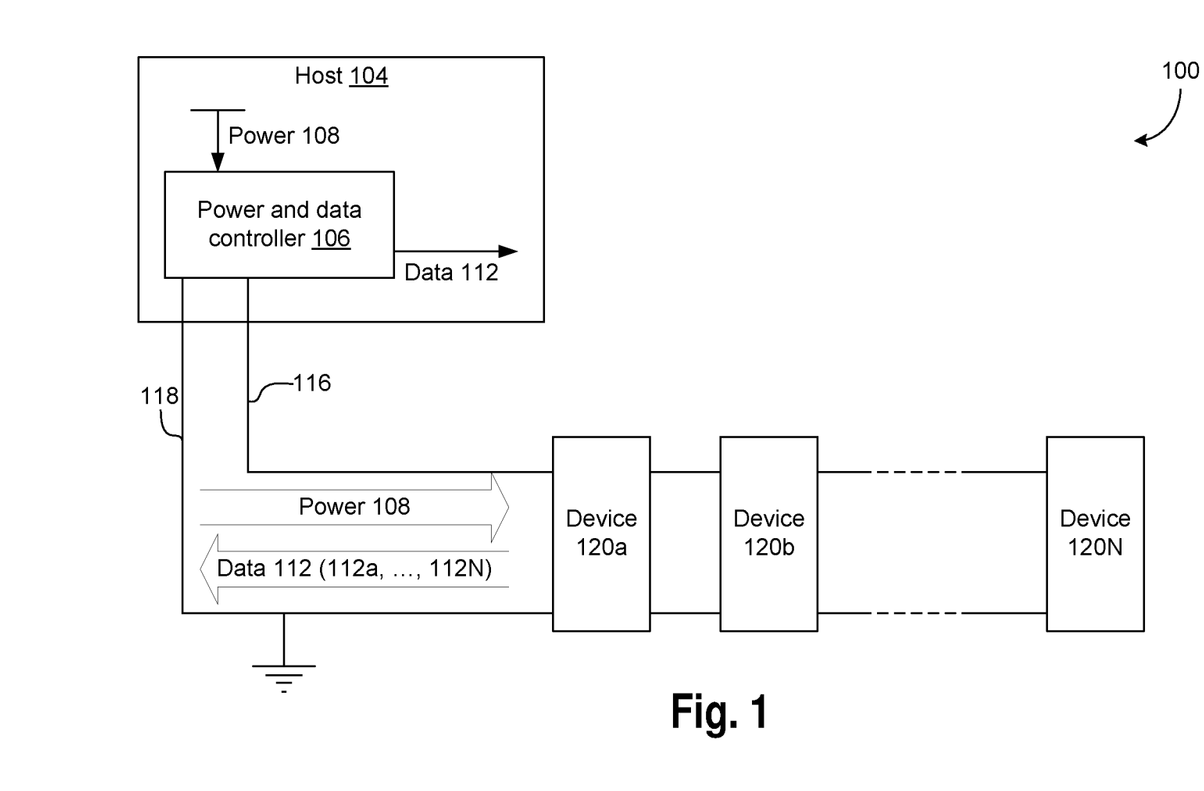
FIG. 1 illustrates a system, where a host is to transmit power to a plurality of devices using a two-wire configuration, and where the host is to receive data from the plurality of devices using the two-wire configuration, according to some embodiments.

FIG. 1 illustrates a system 100, where a host 104 is to transmit power 108 to a plurality of devices 120a, . . . , 120N using a two wire configuration, and where the host 104 is to receive data 112 from the plurality of devices 120a, . . . , 120N using the two wire configuration, according to some embodiments. For example, as will be discussed in further details herein, power 108 and data 112 are transmitted over two wires 116 and 118 in a time-multiplexed manner. For example, during a first time duration, power 108 is transmitted to the device 120a; during a second time duration, data 112a is received from the device 120a; during a third time duration, power 108 is transmitted to the device 120b; during a fourth time duration, data 112b is received from the device 120b, and so on. In an example, the first, second, third, and fourth time durations are consecutive or sequential time durations.

Elements referred to herein with a common reference label followed by a particular number or alphabet may be collectively referred to by the reference label alone. For example, devices 120a, 120b, . . . , 120N may be collectively and generally referred to as devices 120 in plural, and device 120 in singular. Similarly, data 112a, . . . , 112N may be collectively and generally referred to as data 112.

In some embodiments, the host 104 comprises a power and data controller 106 (also referred to as data and power adapter 106, or as controller 106) that selectively transmits power 108 to the devices 120, and receives data 112 from the devices 120. For example, the controller 106 receives power 108 from an appropriate power source and selectively (e.g., in a time-multiplexed manner) transmits the power to the devices 120. The controller 106 also received the data 112 from the devices 120, and outputs the data 112 to an appropriate data processing and/or data storing component (e.g., a memory, a processor, etc., not illustrated in FIG. 1).

In some embodiments, individual ones of the devices 120 comprises corresponding sensors. Merely as an example, individual ones of the devices 120 may comprise one or more temperature sensors, pressure sensors, accelerometers, flow monitors, and/or the like. Thus, for example, the system 100 may be employed in an environment where a plurality of sensors (e.g., devices 120) are deployed, and the two-wire system 100 comprising the wires 116, 118 are used to power the sensors and collect data from the sensors. For example, at a given time, one of the devices (e.g., comprising a corresponding sensor) may be powered and sensed data may be collected, and the cycle may be repeated for other devices as well.

Figure 2:
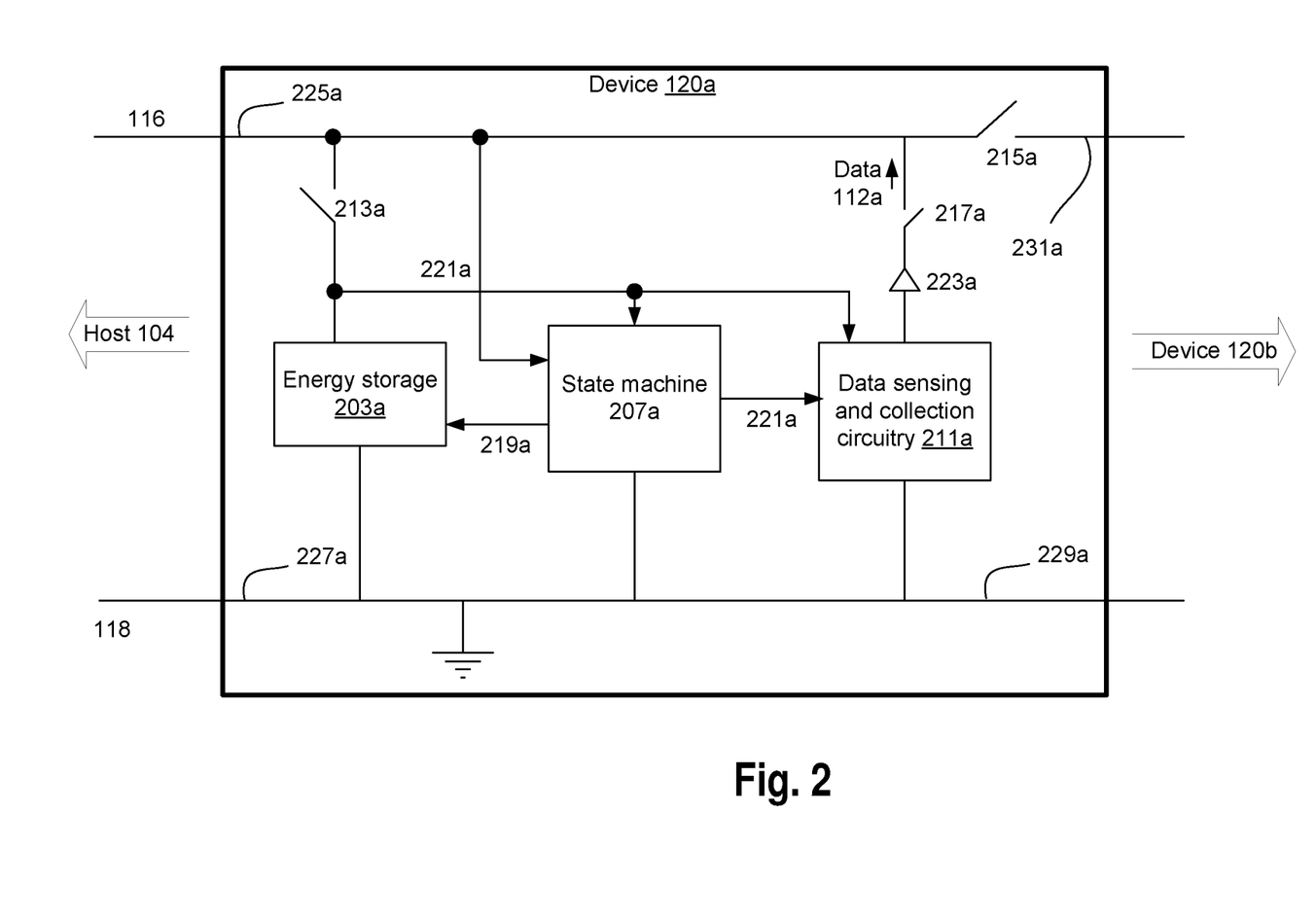
FIG. 2 illustrates an example implementation of a device of the plurality of devices of FIG. 1, according to some embodiments.

FIG. 2 illustrates an example implementation of a device 120 (e.g., the device 120a) of the plurality of devices 120 of FIG. 1, according to some embodiments. Although FIG. 2 illustrates the device 120a, other devices 120b, . . . , 120N may have similar structure.

In some embodiments, the device 120a has four terminals 225a, 227a, 229a, and 231a. The terminals 225a and 227a may be coupled to the host 104 via wires 116 and 118, respectively. In an example, the terminal 227a may be grounded. The terminals 231a and 229a may be coupled to a downstream device in the chain of devices, e.g., to device 120b, using two corresponding wires. Thus, the device 120a is to couple the device 120b and to the host 104.

In some embodiments, the device 120a comprises a data sensing and collection circuitry 211a (also referred to as circuitry 211a). The circuitry 211a may comprise (or be coupled to) an appropriate sensor, such as a temperature sensor, a pressure sensor, an accelerometer, a flow monitor, or the like. The circuitry 211 may also be referred to as a sensor 211a. In an example, the circuitry 211 may comprise a first section for sensing, and a second section for collecting and transmitting the sensed data. In some embodiments, the circuitry 211a may use power from the host 104 (e.g., which may be temporarily stored in an energy storage 203a of the device 120a) to operate.

In some embodiments, when powered ON (e.g., using power 108 from the host 104, received via the energy storage 203a), the circuitry 211a may sense and sample data 211a (e.g., which may be temperature data, pressure data, flow data, or the like, depending on a type of the sensor associated with the circuitry 211a). The circuitry 211a may transmit the sampled data 112a to the host 104 via a switch 217a. For example, the switch 217a may be coupled between the terminal 225a and the circuitry 211a. The circuitry 211a may be coupled between the switch 217a and the terminal 227a.

In some embodiments, a component 223a may be coupled between the circuitry 211a and the switch 217a, where the component 223a may ensure flow of data 112a from the circuitry 211a to the terminal 225a, but may prevent flow of power from the terminal 225a to the circuitry 211a. Thus, for example, the component 223a may allow unidirectional transmission (e.g., transmission of data 112a) from the circuitry 211a to the host 104. As an example, the component 223a may be a diode, a one-way switch, a signal repeater, etc.

In some embodiments, the device 120a comprises a switch 215a coupled between the terminals 225a and 231a. For example, when the switch 215a is open, the host 104 is disconnected from downstream devices 120b, 120c, . . . , 120N.

In some embodiments, the device 120a comprises an energy storage 203a (also referred to as storage 203a), which may be an appropriate energy bank, a rechargeable battery, a capacitor for storing energy, and/or the like. The storage 203a may be coupled to the terminal 225a via a switch 213a, and also coupled to the ground. In some embodiments, the storage 203a may provide energy to various components (e.g., the circuitry 211a, a state machine 207a, etc.) of the device 120a, for operation of these components.

In some embodiments, the device 120a comprises the state machine 207a. The state machine 207a may control a state and operation of various components of the device 120a. For example, the state machine 207a may control switching of the switches 213a, 215a, and 217a. The state machine 207a may also control charging and/or discharging of the energy storage 203a, and operation of the circuitry 211a.

For example, the state machine 207a may sense a state of the wire 116 at the terminal 225a (e.g., the state machine 207a may be coupled to the terminal 225a, by bypassing the switches 213a, 215a, 217a). Based on sensing the state of the wire 116, the state machine 207a may control the operation of the device 120a.

In some embodiments, the state machine 207a may transmit a signal 219a to the energy storage 203a. When appropriate, the state machine 207a may instruct the energy storage 203a (e.g., via signal 219a) to discharge at least a part of stored charge, e.g., to at least in part return to a power-down or discharge state. In some embodiments, the discharge may not need to be completely drained to ground to preserve energy, as long as the state of the energy storage presents itself as being sufficiently discharged. This may also apply to active storage where some data collection may still be performed internally, while the state of device 120a is in power-down mode.

In some embodiments, the state machine 207a may transmit a signal 221a to the circuitry 211a. When appropriate, the state machine 207a may enable the circuitry 211a (e.g., via signal 221a), and may cause the circuitry 211a to collect or sense data 112a and transmit the data 112a to the host 104. When appropriate, the state machine 207a may disable the circuitry 211a (e.g., via signal 221a)

Figure 3:
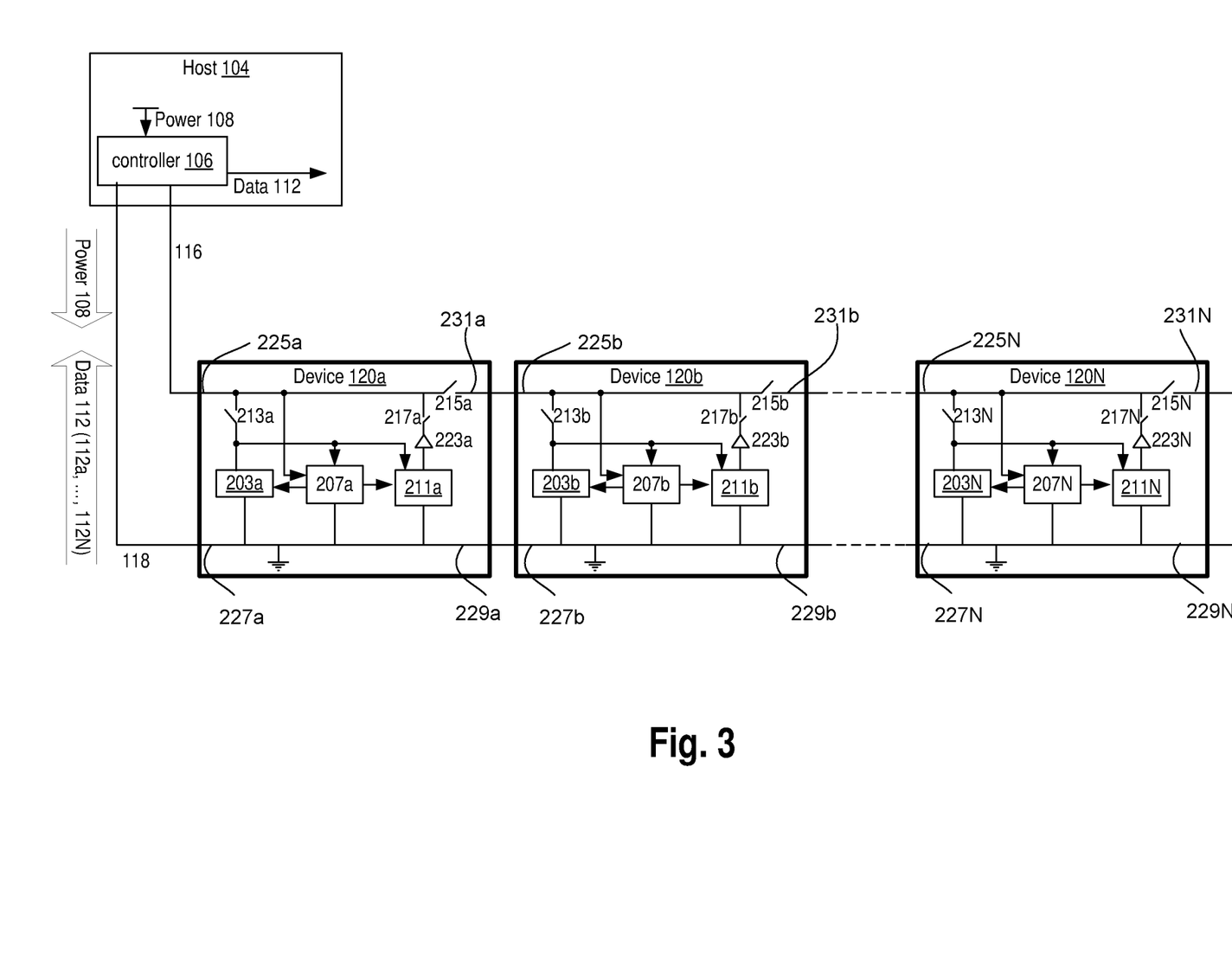
FIG. 3 illustrates an example implementation of multiple devices of the plurality of devices of FIG. 1, according to some embodiments.

FIG. 3 illustrates an example implementation of multiple devices 120 (e.g., the devices 120a, 120b, 120N) of the plurality of devices 120 of FIG. 1, according to some embodiments. Referring to FIGS. 2 and 3, the example implementation of ones of the devices 120b, . . . , 120N may be similar to the example implementation of the device 120a illustrated in FIG. 2. For example, similar to the device 120a, the device 120b comprises an energy storage 203b, switches 213b, 215b, 217b, state machine 207b, circuitry 211b, component 223b, terminals 225b, 227b, 229b, 231b, etc. The device 120N may similarly comprise an energy storage 203N, switches 213N, 215N, 217N, state machine 207N, circuitry 211N, component 223N, terminals 225N, 227N, 229N, 231N, etc. As various components of the devices 120b, 120N may be similar to corresponding ones of the device 120a (e.g., which are discussed with respect to FIG. 2), the components of the devices 120b, 120N are not discussed in further details herein.

There may be some difference in the components of various devices 120a, 120b, . . . , 120N. For example, the data sensing and collection circuitries 211 of various devices 120 may possibly be different. For example, if the device 120a is for sensing temperature, the circuitry 211a (or an associated sensor) may sense temperature and output temperature data; if the device 120b is for sensing pressure, the circuitry 211a (or an associated sensor) may sense pressure and output pressure data, and so on.

Figure 4:
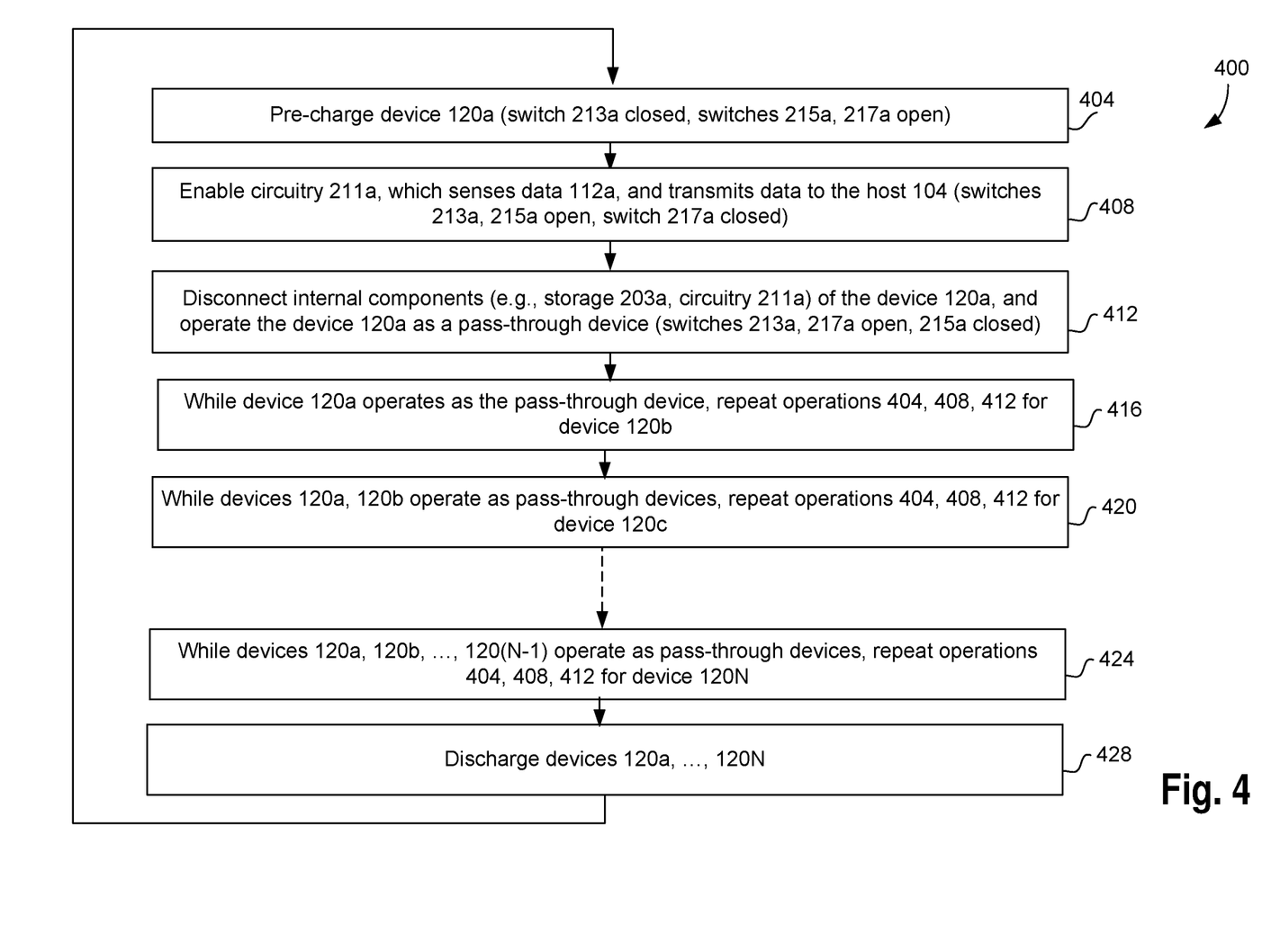
FIG. 4 illustrates a flowchart depicting an example method for operating the system of FIG. 1, according to some embodiments.
Figure 5A:
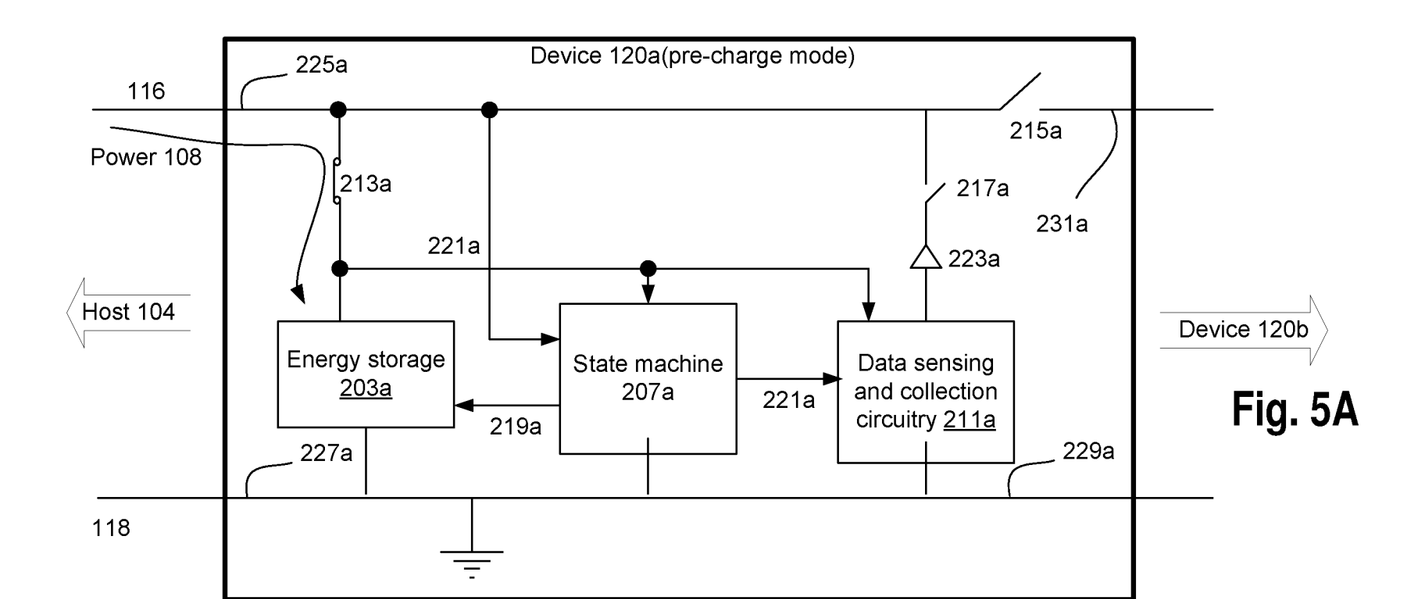
FIGS. 5A-5C illustrate various example states of a device, when various operations of the method of FIG. 4 are being performed, according to some embodiments.
Figure 5B:
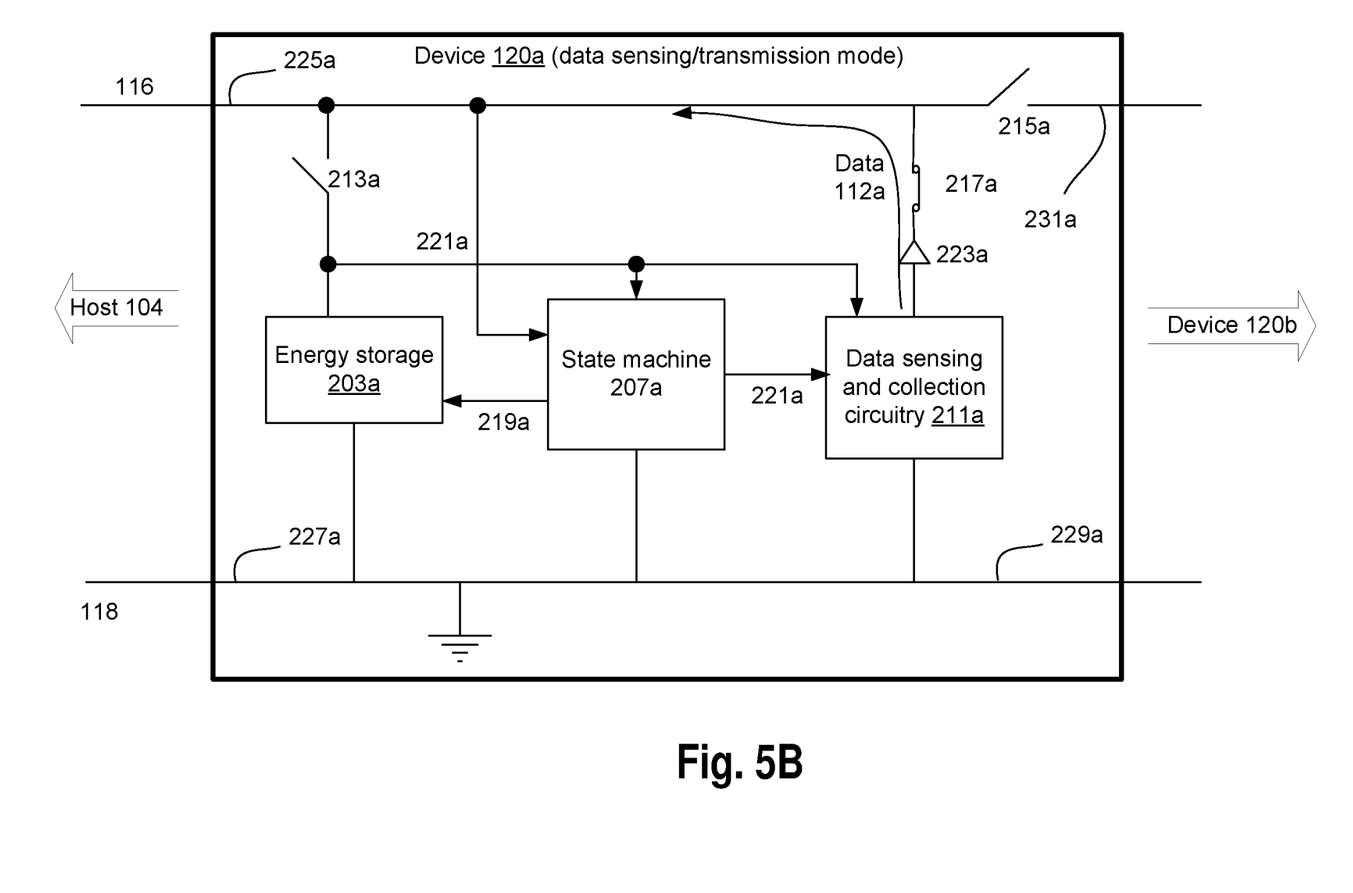
Figure 5C:
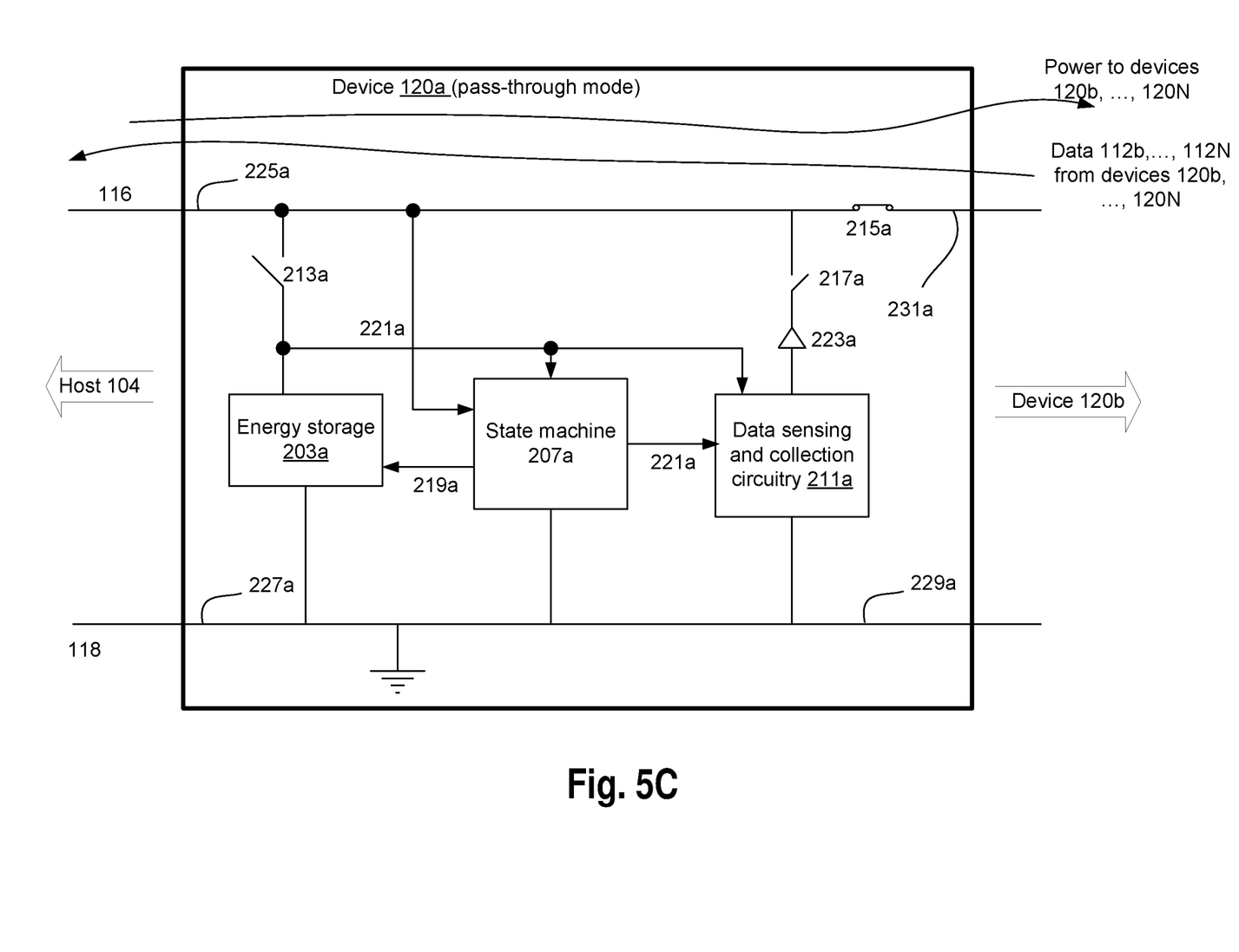
Figure 6:
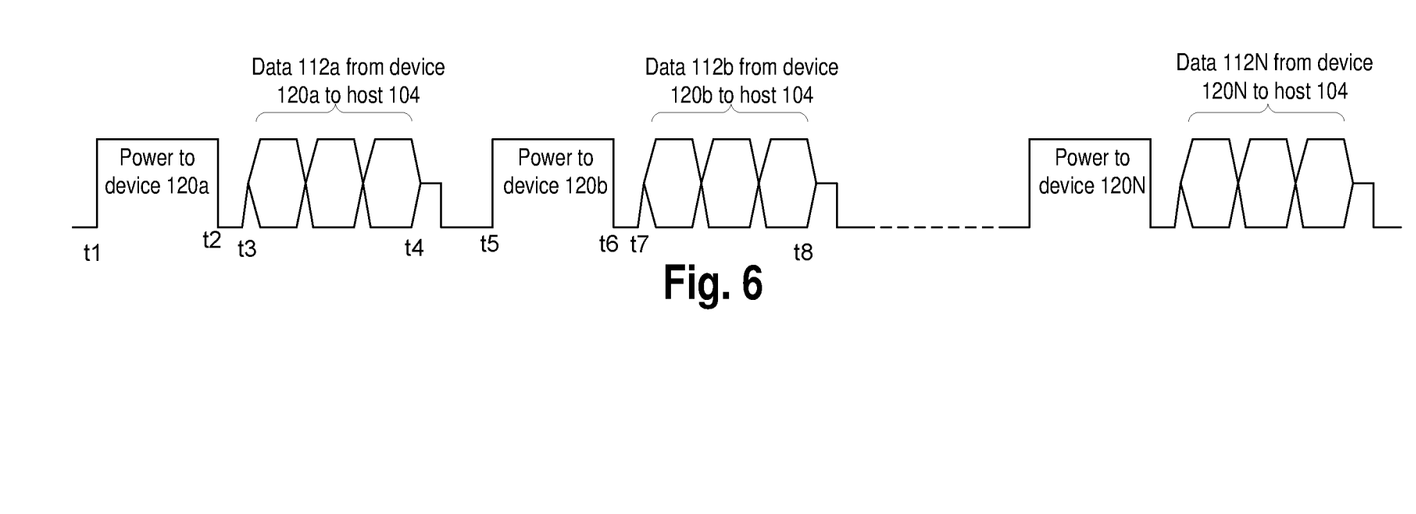
FIG. 6 illustrates an example timing diagram for a wire of the two-wire configuration of the system of FIG. 1, according to some embodiments.

FIG. 4 illustrates a flowchart depicting a method 400 for operating the system 100 of FIG. 1, according to some embodiments. FIGS. 5A-5C illustrate various states of the device 120a, when various operations of the method 400 are being performed, according to some embodiments. FIG. 6 illustrates an example timing diagram for the wire 116 while the method 400 is being performed, according to some embodiments.

With reference to FIG. 4, the illustrated embodiments can be performed in a different order, and some actions/blocks may be performed in parallel. Some of the blocks and/or operations listed in FIG. 4 may be optional in accordance with certain embodiments. The numbering of the blocks presented is for the sake of clarity and is not intended to prescribe an order of operations in which the various blocks must occur.

At 404, the device 120a operates in a pre-charge mode of operation, where the device 120a (e.g., the energy storage 203a) is pre-charged. In FIG. 6, the pre-charge mode of operation for device 120a is between time t1 and t2. FIG. 5A illustrates a state of the switches during the pre-charge mode of operation.

For example, during the pre-charge mode of operation, the switch 213a is closed, and switches 217a and 215a are open, as illustrated in FIG. 5A. The state machine 207a may cause the switch 213a to close, and switches 217a and 215a to open. Power 108 is transmitted from the host 104 to the storage 203a, thereby charging the storage 203a (e.g., the storage 203a stores at least a part of the power 108). During this time (e.g., during the pre-charge mode of operation), the wires 116, 118 transmit power 108 from the host towards the devices 120, and do not carry any data 112. FIG. 6 illustrates the transmission of power from the host 104 to the device 120a between time t1 and t2.

The method then proceeds to 408, where the circuitry 211a is enabled, e.g., by the state machine 207a (also referred to as data sensing/transmission mode of operation). In FIG. 6, the data sensing/transmission mode of operation is between time t3 and t4. FIG. 5B illustrates a state of the switches during the data sensing/transmission mode of operation.

In some embodiments, during the data sensing/transmission mode of operation, the switches 213a and 215a are open, and the switch 217a is closed, as illustrated in FIG. 5B. The circuitry 211a senses data 112a (e.g., using a sensor associated with the circuitry 211a), and transmits the data 112a to the host 104 via the switch 217a and the wires 116, 118. During the data sensing/transmission mode of operation, power to operate the circuitry 211a is received from the energy storage 203a (e.g., using power 108 that was stored in the energy storage 203a at operation 404). During this time (e.g., during the data sensing/transmission mode of operation), the wires 116, 118 transmit sampled data 112a from the device 120a (e.g., from the circuitry 211a) to the host 104, and do not transmit power from the host 104 to the devices 120.

It may be noted that during the pre-charge mode of operation and the data sensing/ transmission mode of operation of the device 120a, the devices 120b, . . . , 120N are not powered, as the switch 215a is open.

The method then proceeds to 412, where the device 120a enters a pass-through mode of operation (also referred to as forward mode of operation). In FIG. 6, the pass-through mode of operation for device 120a is any time after time t4 (or after time t5). FIG. 5C illustrates a state of the switches during the pass-through mode of operation of the device 120a.

During the pass-through mode of device 120a, the device 120a acts as a pass-through device, where the device 120a may pass power 108 from the host 104 to downstream devices 120b, . . . , 120N, and may transmit sampled data 112b, . . . , 112N from the downstream devices 120b, . . . , 120N to the host 104. During the pass-through mode of the device 120a, as illustrated in FIG. 5C, switches 213a, 217a are open, and switch 215a is closed. As the switches 213a, 217a are open, the energy storage 203a and circuitry 211a may be disabled or non-operational. For example, the circuitry 211a may not sense any data, and/or transmit any data to the host 104.

In some embodiments, the energy storage 203a may have some remaining power, which may be used to power the switch 215a (e.g., to maintain a closed state of the switch 215a). For example, the energy storage 203a may power the state machine 207a and the switch 215a, e.g., to maintain a closed state of the switch 215a.

The method then proceeds to 416, where, while the device 120a is in the pass-through mode, the operations 404, 408, and 412 may be repeated for the device 120b. Thus, at operation 416, while the device 120a is in the pass-through mode, the device 120b may undergo through the above discussed pre-charge mode of operation, data sensing/transmission mode of operation, and the pass-through mode of operation. It may be noted that during the pre-charge mode of operation and the data sensing/transmission mode of operation of the device 120b, the devices 120c, . . . , 120N are not powered, as the switch 215b is open. Also, during the pre-charge mode of operation and the data sensing/ transmission mode of operation of the device 120b, the device 120a is in the pass-through mode—thus, the device 120a simply passes power and data between the host 104 and the device 120b, without receiving power from the host 104 or without transmitting data to the host 104.

The method 400 then proceeds to 420, where, while the devices 120a, 120b are in the pass-through mode, the operations 404, 408, and 412 may be repeated for the device 120c. Thus, at operation 420, while the devices 120a, 120b are in the pass-through mode, the device 120c may undergo through the above discussed pre-charge mode of operation, data sensing/transmission mode of operation, and the pass-through mode of operation. It may be noted that during the pre-charge mode of operation and the data sensing/ transmission mode of operation of the device 120c, the devices 120d, . . . , 120N are not powered, as the switch 215c is open. Also, during the pre-charge mode of operation and the data sensing/ transmission mode of operation of the device 120c, the devices 120a, 120b are in the pass-through mode—thus, the devices 120a, 120b simply pass power and data between the host 104 and the device 120c, without receiving power from the host 104 or without transmitting data to the host 104.

This process may be repeated sequentially for the devices 120d, 120e, and so on (illustrated symbolically using doted arrow between boxes 416 and 420). For example, at 424, while the devices 120a, 120b, . . . , 120(N-1) are in the pass-through mode, the operations 404, 408, and 412 may be repeated for the device 120N.

Thus, during operations 404, . . . , 424 of the method 400, for each of the devices 120a, . . . , 120N, the host 104 may transmit power 108 to a device 120 for pre-charging the device 120 and the device 120 may then transmit the data 112 to the host 104. The transmission of power 108 for pre-charging the devices 120 and for transmission of data 112 from the devices 120 to the host 104 may be over the wires 116, 118. Thus, the same wires 116, 118 may be used by the host 104 in a time-multiplexed manner to transmit power 108 to the devices 120, as well as receive data 112 from the devices 120.

The method 400 may then proceed to 428, where all the devices 120a, . . . , 120N may be discharged (also referred to as power down mode or discharge mode of operation). For example, the energy storages 203a, 203b, 203c, . . . , 203N may be discharged (e.g., power stored in the energy storages 203 may be grounded). The host 104 (e.g., the controller 106) may activate the power down mode by, for example, keeping the voltage of the wire 116 to a low value (e.g., substantially zero or grounded) for at least a threshold period of time. The state machines 207a, . . . , 207N of the devices 120a, . . . , 120N, respectively, may sense this, and may cause any residual energy stored in the corresponding energy storages 203 to be discharged. The devices 120 may then be inactive (e.g., no power is now supplied to the devices 120, and the devices 120 also have no stored power in the energy storages 203). In some embodiments, during the power down mode or discharge mode of operation, various switches of the devices 120 may be off, e.g., in open states.

In an example, the operation at 428 may be at least in part optional. For example, in some examples, the energy storages 203 may not be discharged, and any remaining energy may be used for a subsequent repetition of the method 400. In some other examples, the energy stored in the energy storages 203 may gradually leak and discharge on its own, without the devices 120 taking any active steps to discharge the energy.

In some embodiments, the method 400 may be repeated in a loop (e.g., the method 400 may loop back to 404, after 428). For example, whenever the host 104 is to collect sensor information (e.g., data 112) from the devices 120, the method 404 may be initiated and/or repeated.

Various examples and embodiments herein (e.g., FIG. 4) discloses that a device 120 (e.g., device 120a) can sense data merely during the data sensing/transmission mode of operation (e.g., after the pre-charging mode), using energy stored in the energy storage 203a. However, in some other embodiments, the device 120 (e.g., the circuitry 211a) may sense data even when the device 120a is not operating in the data sensing/transmission mode. For example, the device 120 (e.g., the circuitry 211a) may sense data periodically or intermittently, even when the device 120a is in the pass-through mode, using energy from the energy storage 203a. In such examples, the energy storage 203a may have capacity that may be sufficient to power such sensing. The sensed data may be stored in a memory of the device 120a (where the memory is not illustrated in FIG. 2). Whenever the turn of device 120a comes to transmit sampled data 112a (e.g., during the data sensing/transmission mode between times t3 and t4 of FIG. 6), the stored data may be transmitted to the host 104.

In some embodiments, the controller 106 of the host 104 may be synchronized with the devices 120 to transmit power 108 to the devices 120 and receive data 112 from the devices 120 on a time-multiplexing basis. For example, referring to FIGS. 1 and 6, between times t1 and t2, the controller 106 of the host 104 may transmit power 108 towards the devices 120. Between times t3 and t4, the controller 106 of the host 104 may expect to receive data 112a from the device 120a. Similarly, between times t5 and t6, the controller 106 of the host 104 may transmit power 108 towards the devices 120. Between times t7 and t8, the controller 106 of the host 104 may expect to receive data 112b from the device 120b. This process may be repeated to sequentially charge the devices 120 and receive data from the devices 120, in series.

In some examples, the bus from the host 104 to the devices 120 (e.g., comprising the wires 116, 118) may operate, at any given time, in one of the three states: (i) a power transmission state, when power is transmitted from the host 104 to any one of the devices 120, (ii) a data collection state, when data is received by the host 104 from any one of the devices 120, and (iii) a discharge state, when the bus is neither transmitting data nor power, the energy storages 203 are discharged, and the devices 120 are idle.

Although FIGS. 4, 5A, 5B, and 5C illustrate example ways to operate the system 100, various variations may be envisioned by those skilled in the art, based on the teachings of this disclosure. For example, in FIGS. 4 and 5C, during the pass-through mode of a device 120 (e.g., device 120a), the corresponding switch 213a is off. Thus, during the pass-through mode, the energy storage 203a may be disconnected from the host 104. In some embodiments, to maintain the switch 215a in the ON position during the pass-through mode of the device 120a, some power may be used. In one example, such power may be supplied by residual power stored in the energy storage 203a. In another example, to maintain the switch 215a in the ON position during the pass-through mode of the device 120a, the switch 213a may be ON, or is switched ON intermittently, (e.g., so that the energy storage 203a has sufficient power to maintain the switch 215a at ON position). In another example, to maintain the switch 215a in the ON position during the pass-through mode of the device 120a, the switch 213a may be switched ON when the energy stored in the energy storage 203a is below a threshold (e.g., is insufficient to maintain the switch 215a at ON position).

Various examples and embodiments herein discloses that a first device (e.g., device 120a) is charged and then data is extracted from the first device, then a second device (e.g., device 120b) is charged and then data is extracted from the second device, and this process is repeated for all the devices 120 (e.g., as illustrated in the timing diagram of FIG. 6). Such a sequence may be modified in some examples. For example, all the devices 120 (or at least some of the devices 120) may be pre-charged at the same time (e.g., at the beginning of a cycle, when no data is being collected, etc.), e.g., using the wires 116 and 118 (e.g., in such a case where devices 120a and 120b are charged simultaneously, the switches 213a, 213b are ON and the switch 215a is also ON). This assumes that the host 104 has sufficient power rating to charge more than one devices 120 at a time. This also assumes that the energy storages 203 has capacity to store charge for a longer period of time (e.g., the energy storages 203 are rechargeable batteries). When the host 104 is to access the data from the devices 120, the host 104 may stop supplying power to the devices 120, and may receive data sequentially from the devices 120 (e.g., first receive data 112a from device 120a, then receive data 112b from device 112b, and so on).

Figure 7:
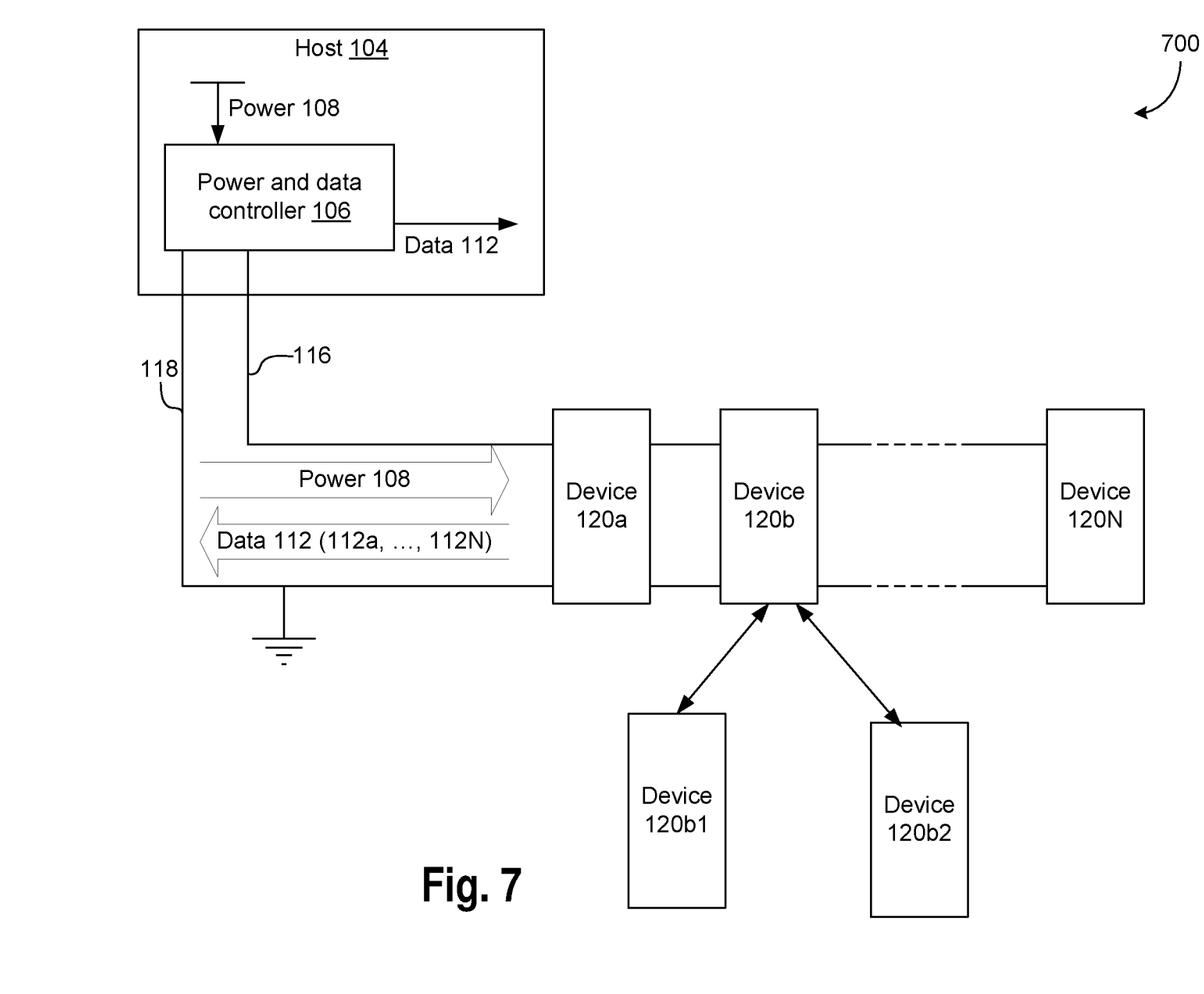
FIG. 7 illustrates a system, where a host is to transmit power to a plurality of devices using a two wire configuration, where the host is to receive data from the plurality of devices using the two wire configuration, and where two or more devices may be arranged in a cluster or hub arrangement, according to some embodiments.

Although FIGS. 1-5C illustrate the devices arranged in series, in some embodiments, the arrangement of the devices 120 may be altered. For example, FIG. 7 illustrates a system 700, where a host 104 is to transmit power 108 to a plurality of devices 120a, . . . , 120N using a two wire configuration, where the host 104 is to receive data 112 from the plurality of devices 120a, . . . , 120N using the two wire configuration, and where two or more devices may be arranged in a cluster or hub arrangement, according to some embodiments. For example, the system 700 may be at least in part similar to the system 100 of FIGS. 1-5C. However, unlike the system 100, in the system 700, the device 120b may act as a hub for a cluster of devices 120b1 and 120b2. For example, each of the devices 120b1 and 120b2 may include corresponding sensors. The devices 120b1 and 120b2 may either receive power from the energy storage 203b of the device 120b, or may have their own individual energy storages. Referring to FIGS. 6 and 7, in an example, the device 120b may transmit sampled data 112b from the devices 120b1 and 120b2 during the time period t7-t8. Thus, data 112b may be a combination of sensed data from the devices 120b1, 120b2.

Various embodiments and examples discussed herein may transmit power to, and receive data from multiple devices (e.g., sensors) with merely two wires. The system 100 may be scalable, e.g., additional devices may be easily added in the chain of devices. The devices 120 may be distributed over a wide geographical area, e.g., tens of meters. The extent of the covered geographical area may be merely limited by lengths of the wires 116, 118, and power driving capacity of the host 104 and signal/data driving capacity of the devices 120. No additional power or data lines (e.g., in addition to the two wires 116, 118) may be used to supply power and/or data to the device 120. Merely two wires may be used—wire 118 for ground connection, and wire 116 to serve dual purposes of power supply to and data collection from the devices 120. In an example, the system 100 may be deployed in harsh environments, such as automobiles, factory floors, etc.

Figure 8:
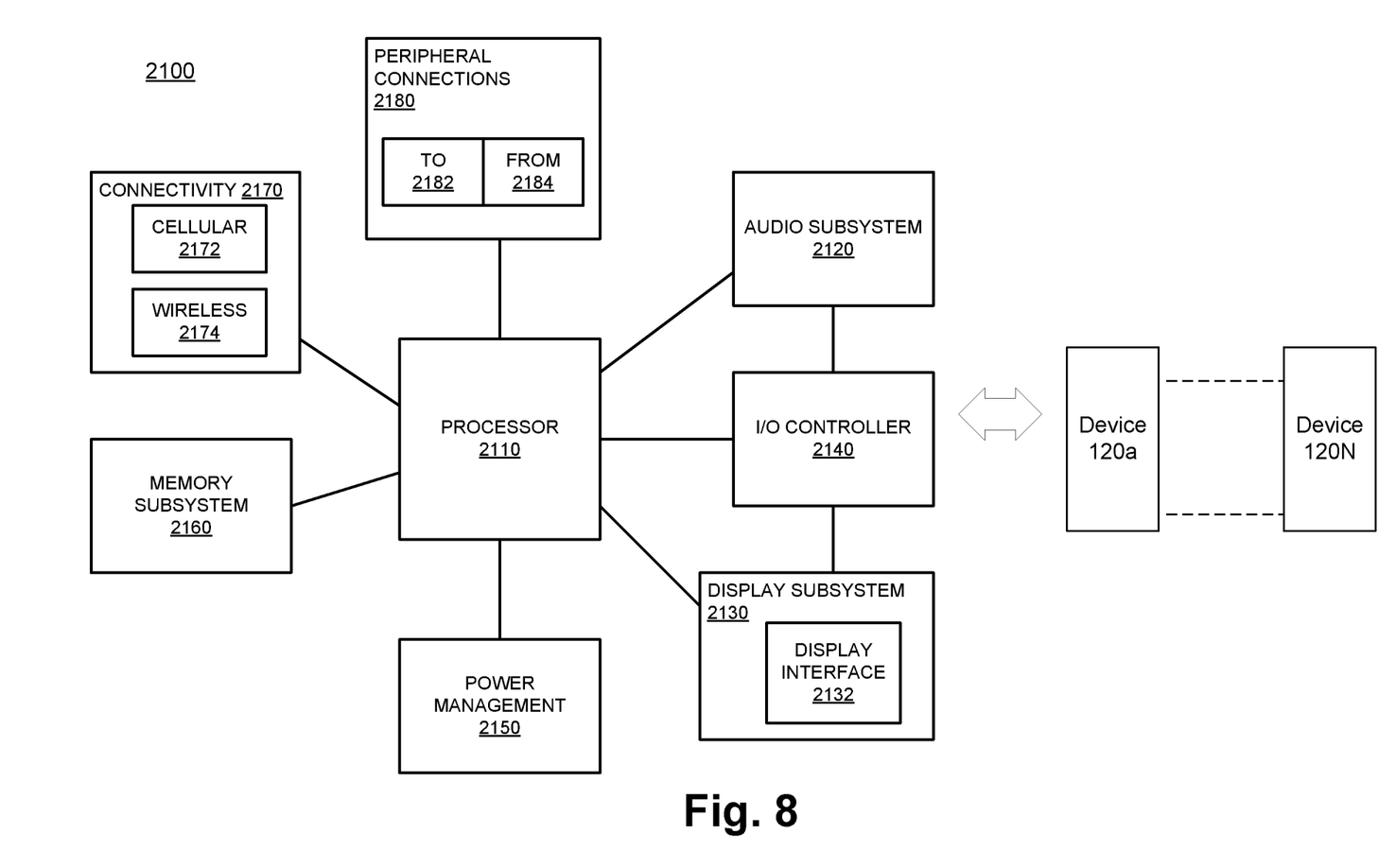
FIG. 8 illustrates a computing device or a SoC (System-on-Chip) that may be used to implement the host to FIGS. 1-7, according to some embodiments.

FIG. 8 illustrates a computing device or a SoC (System-on-Chip) 2100 that may be used to implement the host 104 to FIGS. 1-7, according to some embodiments. It is pointed out that those elements of FIG. 8 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/0 functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise one or more sensors 2134, e.g., low power sensors, low resolution sensors, a heart monitor sensor, one or more sensors associated with a vehicle, pressure sensors, general use temperature sensors.

The computing device 2100 may be used to implement the host 104. For example, the computing device 2100 may be coupled to the devices 120a, . . . , 120N. The computing device 2100 (e.g., the processor 2110 via the controller 106) may receive data from the devices 120. A memory of the computing device 2100 (e.g., a memory of the memory subsystem 2160) may store data 112 received from the devices 120. The computing device 2100 and the devices 120 may operate to time-multiplex transmission of power and data over a two-wire link, as discussed with respect to FIGS. 1-7.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
    a first terminal and a second terminal to be coupled to a host via a first wire and a second wire, respectively;
    a third terminal and a fourth terminal operable to couple to a second apparatus via a third wire and a fourth wire, respectively;
    a first switch to selectively couple the first terminal and the third terminal, wherein the second terminal and the fourth terminal are coupled;
    a rechargeable storage; and
    a data circuitry,
    wherein the apparatus is to:
        during a first time-period, receive power via the first wire and the second wire from the host, and store the power in the rechargeable storage, and
        during a second time-period, transmit data from the data circuitry to the host via the first wire and the second wire,
    wherein the first and second time-periods are non-overlapping time periods, and
    wherein the apparatus is to refrain from transmitting any data to, or receiving any data from, the host during the first time period.

2. The apparatus of claim 1, wherein the apparatus is to refrain from receiving any power from the host during the second time period.

3. The apparatus of claim 1, further comprising:
    a second switch coupled between the rechargeable storage and the first terminal; and
    a third switch coupled between the data circuitry and the first terminal.

4. The apparatus of claim 3, wherein the apparatus is to:
    during the first time-period, close the second switch to receive power in the rechargeable storage and open the second and third switches.

5. The apparatus of claim 3, wherein the apparatus is to:
during the second time-period, close the third switch to transmit data from the data circuitry to the host, and open the first and second switches.

6. The apparatus of claim 3, wherein the apparatus is to:
during a third time-period, open the second and third switches and close the first switch, to allow the host to transmit power to the second apparatus and receive data from the second apparatus via the first apparatus.

7. The apparatus of claim 6, wherein the apparatus is to:
during a fourth time-period, open the first, second and third switches, and discharge the rechargeable storage.

8. The apparatus of claim 3, further comprising:
a state machine to control operation of the first, second and third switches.

9. The apparatus of claim 1, wherein the apparatus is to:
during a third time-period, forward power from the host to a second apparatus; and
during a fourth time-period, forward data from the second apparatus to the host.

10. A system comprising:
a memory to store instructions;
a processor coupled to the memory, the processor to execute the instructions; and
a controller coupled to one or both the processor or the memory, wherein the controller is to:
transmit, over a first wire and a second wire, power to a plurality of devices, and
receive, over the first wire and the second wire, data from the plurality of devices,
wherein the controller is to time multiplex the transmission of the power and the reception of the data,
wherein the controller is to refrain from transmitting power while receiving data, and refrain from receiving data while transmitting power, and
wherein the controller is to ground the first and second wire for at least a threshold period of time, to signal the plurality of devices to discharge any energy stored in the plurality of devices.

11. The system of claim 10, wherein the system comprises:
a wireless interface to allow the processor to communicate with another system,
wherein the memory is to store the data received from the plurality of devices.

12. The system of claim 10, wherein the plurality of devices comprises:
a first device coupled to the controller using the first wire and the second wire;
a second device coupled to the first device using a third wire and a fourth wire, the controller coupled to the second device via the first device; and
a third device coupled to the second device using a fifth wire and a sixth wire, the controller coupled to the third device via the first and second devices.

13. The system of claim 12, wherein the controller is to:
during a first time-period, transmit power to the first device over the first and second wires;
during a second time-period occurring subsequent to the second time-period, receive first data from the first device over the first and second wires;
during a third time-period occurring subsequent to the second time-period, transmit power to the second device over the first and second wires; and
during a fourth time-period occurring subsequent to the third time-period, receive second data from the second device over the first and second wires,
wherein the first, second, third, and fourth time period are non-overlapping time periods.

14. The system of claim 13, wherein the controller is to:
during a fifth time-period occurring subsequent to the fourth time-period, transmit power to the third device over the first and second wires; and
during a sixth time-period occurring subsequent to the fifth time-period, receive third data from the third device over the first and second wires.

15. The system of claim 10, wherein the system is to be coupled to the plurality of devices over a communication link consisting of the first wire and the second wire, wherein the second wire is to be coupled to a ground terminal.

16. A method comprising:
receiving, by a first device and during a first time-period, power over a first link and a second link from a host;
pre-charging, by the first device and during a first time-period, a battery using power received over the first link and the second link from the host;
transmitting, by the first device and during a second time-period, first data over the first link and the second link to the host;
forwarding, by the first device and during a third time-period, power from the host to a second device; and
forwarding, by the first device and during a fourth time-period, second data from the second device to the host,
wherein the first, second, third and fourth time periods are consecutive and non-overlapping time periods.

17. The method of claim 16, wherein forwarding power from the host to the second device comprises:
receiving, by the first device and during the third time-period, power over the first link and the second link from the host; and
transmitting, by the first device and during the third time-period, power over a third link and a fourth link to the second device.

18. The method of claim 17, wherein forwarding the second data from the second device to the host comprises:
receiving, by the first device and during the fourth time-period, the second data over the third link and the fourth link from the second device; and
transmitting, by the first device and during the fourth time-period, the second data over the first link and the second link to the host.

* * * * *